United States Patent
Sun et al.

(10) Patent No.: US 9,359,214 B2
(45) Date of Patent: Jun. 7, 2016

(54) SILICA NANOAGGREGATES AND ORGANOSILICON COMPLEXES AND METHODS OF FORMING THEM FROM BIOMASS MATERIALS

(75) Inventors: Luyi Sun, Pearland, TX (US); Weixing Wang, Guangzou (CN)

(73) Assignee: Texas State University-San Marcos, San Marcos, TX (US)

( * ) Notice: Subject to any disclaimer, the term of this patent is extended or adjusted under 35 U.S.C. 154(b) by 279 days.

(21) Appl. No.: 14/002,011

(22) PCT Filed: Feb. 28, 2012

(86) PCT No.: PCT/US2012/026891
§ 371 (c)(1),
(2), (4) Date: Nov. 8, 2013

(87) PCT Pub. No.: WO2012/148561
PCT Pub. Date: Nov. 1, 2012

(65) Prior Publication Data
US 2014/0057108 A1   Feb. 27, 2014

Related U.S. Application Data

(60) Provisional application No. 61/464,055, filed on Feb. 28, 2011, provisional application No. 61/517,307, filed on Apr. 18, 2011.

(51) Int. Cl.
*C01B 33/12*   (2006.01)
*C01B 33/18*   (2006.01)

(52) U.S. Cl.
CPC .............. *C01B 33/126* (2013.01); *C01B 33/12* (2013.01); *C01B 33/18* (2013.01); *Y10T 428/2982* (2015.01)

(58) Field of Classification Search
CPC ...... C01B 33/126; C01B 33/18; C01B 33/12; Y10T 428/2982
See application file for complete search history.

(56) References Cited

U.S. PATENT DOCUMENTS

| 8,679,438 B2 | 3/2014 | Laine et al. |
| 2003/0012720 A1* | 1/2003 | Victor ............ C01B 33/18 423/335 |
| 2003/0096900 A1 | 5/2003 | Holden |

(Continued)

OTHER PUBLICATIONS

Rice husk ash as an alternate source for active silica production Materials Letters (2002), 57(4), 818-821 CODEN: MLETDJ; ISSN: 0167-577X; English.*

(Continued)

*Primary Examiner* — Richard M Rump
(74) *Attorney, Agent, or Firm* — Meyertons, Hood, Kivlin, Kowert & Goetzel, P.C.; Eric B. Meyertons

(57) ABSTRACT

By controlling the pre-treatment of biomass materials and pyrolysis conditions, silica samples with various surface areas and levels of crystallinity were synthesized. With proper treatment, biogenic silica nanoaggregate (25-30 nm in diameter) can be synthesized from biomass materials. The characterizations revealed that the silica nanoaggregates were composed of smaller primary silica nanoparticles (ca. 4.2 nm in diameter). Under controlled melting catalyzed by metal salt cations, the silica nanoaggregates may be fuse to form semi-crystalline porous silica frameworks with tunable pore size and structural integrity. Organosilicon complexes were synthesized from the bio derived silica nanoaggregates.

7 Claims, 10 Drawing Sheets

(56) References Cited

U.S. PATENT DOCUMENTS

| | | |
|---|---|---|
| 2007/0276051 A1 | 11/2007 | Halimaton |
| 2008/0286383 A1 | 11/2008 | Nunn |
| 2010/0061910 A1 | 3/2010 | Kondoh et al. |

OTHER PUBLICATIONS

Real, Concha, Maria D. Alcala, and Jose M. Criado. "Preparation of silica from rice husks." Journal of the American ceramic society 79.8 (1996): 2012-2016.*

International Search Report/Written Opinion for PCT Application No. PCT/US2012/026891 issued Nov. 29, 2012.

International Preliminary Report on Patentability for PCT Application No. PCT/US2012/026891 issued Sep. 3, 2013.

Mann et al. "Molecular tectonics in biomineralization and biomimetic materials chemistry" Nature, 1993, 365, 499-505.

Oliver et al. "Lamellar aluminophosphates with surface patterns that mimic diatom and radiolarian microskeletons" Nature 378, 47-50 (1995), Abstract.

Mann et al. "Synthesis of inorganic materials with complex form" Nature, 1996, 382, 313-318.

Ding et al. "Silicon isotope study on rice plants from the Zhejiang province, China" Chem. Geol., 2005, 218, 41-50, Abstract.

Sun et al. "Silicon-Based Materials from Rice Husks and Their Applications" Ind. Eng. Chem. Res., 2001, 40 (25), pp. 5861-5877, Abstract.

Asuncion et al. "The selective dissolution of rice hull ash to form [OSiO1.5]8[R4N]8 (R = Me, CH2CH2OH) octasilicates. Basic nanobuilding blocks and possible models of intermediates formed during biosilicification processes" J. Mater. Chem., 2005,15, 2114-2121. Abstract.

Umeda et al. "Process Parameters Optimization in Preparing High-Purity Amorphous Silica Originated from Rice Husks" Mater. Trans., 2007, 48, 3095-3100.

Zhang et al. "A study on the consecutive preparation of D-xylose and pure superfine silica from rice husk" Bioresource Technology, vol. 101, Issue 4, Feb. 2010, pp. 1263-1267.

Liou et al. "Synthesis and surface characteristics of nanosilica produced from alkali-extracted rice husk ash" Ind. Eng. Chem. Res., 2010, 49, 8379-8387.

Chandrasekhar et al. "Hypervalent tris(catecholato)silicate derived from rice husk ash" Tetrahedron Letters, vol. 39, Issue 46, 1998, pp. 8505-8508.

* cited by examiner

SILICA NANOAGGREGATES AND ORGANOSILICON COMPLEXES AND METHODS OF FORMING THEM FROM BIOMASS MATERIALS

BACKGROUND OF THE INVENTION

1. Field of the Invention

The invention generally relates to silica nanoaggregates and methods of making silica nanoaggregates. More specifically, the invention relates to the silica nanoaggregates obtained from biomass materials.

2. Description of the Relevant Art

Silica is a very important industrial material and has found widespread applications. In particular, silica nanoparticles with high surface area (porous and/or with a small particle size), are of high interest to many key chemical applications, such as sorption, insulating, sensing, separation, and catalysis. Recently, porous silica for biomedical applications, such as controlled release and biosensing, have also been explored.

Many approaches have been developed to synthesize porous silica and silica nanoparticles. Usually, a silica precursor, such as silicon alkoxide (typically silicon tetraethoxysilane) is used as the silicon source. While such methods are effective to synthesize various silicas with controlled particle size, morphology, and porosity, their main disadvantages are the cost and sustainability issues associated with the silica precursors. Silicon alkoxides are typically synthesized from a multi-step reaction route starting from the carbothermal reduction of raw silica, such as sand. Such chemical processes are energy intensive and associated with high temperature, high pressure, and strong acidity, and thus ecohazardous. Considering the ever increasing demand on porous silica and silica nanoparticles for new applications, the current approach to synthesize porous silica and silica nanoparticles may not be sustainable and not match the cost requirement. Thus, it is highly desirable to seek an alternative approach that is more economical and environmentally benign.

SUMMARY OF THE INVENTION

A method of preparing silica nanoaggregates includes heating biomass material in an acidic medium; and heating the acid treated biomaterials to a temperature of at least about 500° C. for at least about 1 hour. In some embodiments, the biomass material is rice husks. In some embodiments, the acidic medium is hydrochloric acid. The acid treated biomaterial may be heated at a temperature of between about 500° C. and about 850° C. to form silica nanoaggregates. The heat treatment time may be between about 0.5 hour to about 2 hours. Prior to acid treating biomaterial, the biomaterial may be washed with water and dried.

The resulting silica nanoaggregates are composed of a plurality of silica nanoparticles having an average particle size of less than about 10 nm. The silica nanoaggregate has an average diameter of about 20 nm to about 100 nm. The silica nanoaggregate also comprises pores, the pores having an average diameter of less than about 10 nm.

A porous silica structure may be formed by treating silica nanoaggregates with an aqueous metal salt composition. The salt treated silica nanoaggregates are heated at a temperature of at least about 600° C. for at least about 1 hour to form a porous silica structure. In some embodiments the aqueous metal salt composition is an alkali metal salt composition.

In some embodiments, the alkali metal salt composition is a potassium salt. Treating silica nanoaggregates with an aqueous metal salt composition includes mixing the silica nanoaggregates with the aqueous metal salt composition; and treating the mixture of silica nanoaggregates in the aqueous metal salt composition with ultrasound. To form the porous silica structure, the salt treated silica nanoaggregates are treated at a temperature of between about 600° C. and about 1100° C. The salt treated silica nanoaggregates may be treated for a time of between about 0.2 hour to about 8 hours. The resulting porous silica structure may be composed of semicrystalline to crystalline silica comprising pores having an average pore diameter of between about 10 nm to about 200 nm.

Alternatively, biomasses can be directly treated by an aqueous metal salt composition, and subsequently treated at a temperature of between about 600° C. and about 1100° C. for about 0.2 hour to about 8 hours to form porous semicrystalline to crystalline silica.

In an embodiment, organosilicon complexes may be formed by reacting ethylene glycol in the presence of an alkali metal base or alkali earth metal base with silica nanoaggregates. The alkali metal base may be an alkali metal hydroxide base (e.g., potassium hydroxide).

BRIEF DESCRIPTION OF THE DRAWINGS

Advantages of the present invention will become apparent to those skilled in the art with the benefit of the following detailed description of embodiments and upon reference to the accompanying drawings in which.

Figure 1B:
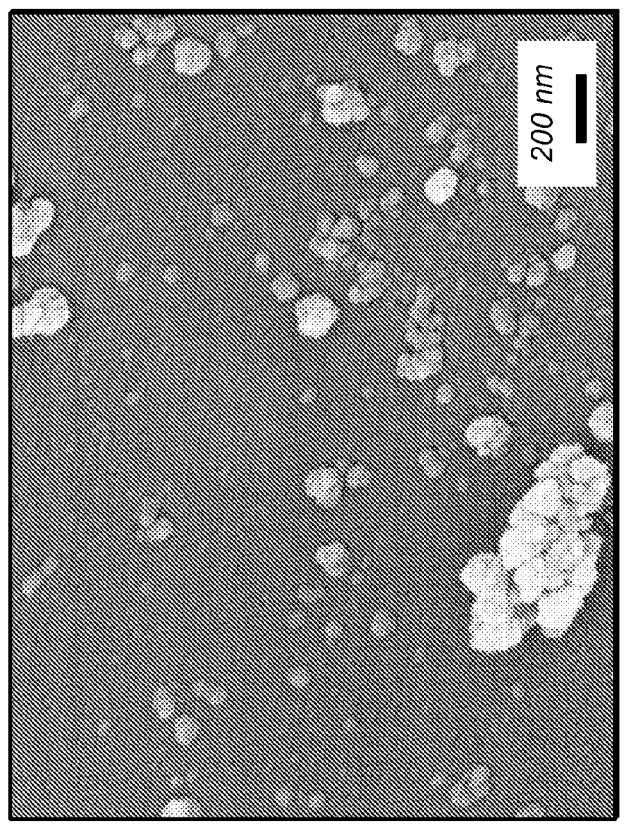
FIG. 1B depicts an SEM image of silica particle agglomerates synthesized from the water rinsed RHs.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

In an embodiment, silica nanoaggregates may be prepared by heating biomass material in an acidic medium. The resulting acid treated biomass materials are heated to a temperature of at least about 500° C. for at least about 1 hour to produce silica nanoaggregates.

As used herein the term silica nanoaggregate is defined as an aggregate of silica nanoparticles. The silica nanoparticles, in some embodiments, have an average diameter of less than about 10 nm. The silica nanoaggregate has an average diameter of less than 1 um, less than 500 nm, less than 100 um, or less than 50 um. In some embodiments, a silica nanoaggregate has a diameter of between about 20 nm and 100 nm, or between about 20 nm and 30 nm. A silica nanoaggregate, composed of nanoparticles of silica, will have a porous structure due to the substantially spherical nature of the silica nanoparticles. The pores of the silica nanoaggregate have an average diameter of less than about 10 nm. Typically, the pore size ranges between about 2 nm to 9 nm.

Acid treatment of the biomass material may be conducted using an aqueous acid. For example, acid treatment of the biomass material may be conducted by boiling the biomass material in hydrochloric acid for at least about 0.5 hours. After the acid treatment is completed, the biomass material is washed with water to remove the acid, and dried in an oven at about 100° C. Typically the biomass material will be dry after about 12 hours at 100° C.

In some embodiments, the silica nanoaggregates may be formed by heating the acid treated biomass materials to a temperature of between about 500° C. to about 850° C. Heating of the acid treated biomass may be conducted for about 0.5 hour to about 2 hours.

In one embodiment, silica nanoaggregates may be produced from rice husks (RHs). Biomineralization of silica creates a silica cell wall in rice husks. While the silica structures from RHs appear to be much less complicated and less visually attractive compared to the ones from diatoms, the large quantities of RH biomass offer an opportunity for mass production of nanostructured silica for industrial applications. RHs typically contain 20-22% total weight of rice grains. In 2007, the estimated global rice production is ca. 650 million tons. However, owing to their tough, abrasive nature, low nutritive properties, great bulk, and high ash content, efforts to utilize RHs have been very limited. In some countries, RHs have to be disposed with additional cost, and even leading to pollution issues. Harvesting silica from RHs can not only take full advantage of the highest possible value from RH biomass, but also minimize the related environmental issues from the current applications/disposals of RHs.

In RHs, silica is in hydrated amorphous form and accounts for up to ca. 12-20 wt % of dry RH, depending on the variety, climate, and geographic location. Various approaches to extract silica from RHs have been explored. While the earlier work mainly focused on the purity of the obtained silica, the morphology and microstructure of RH silica have been largely ignored. We have found that the morphology and microstructure of the biogenic silica in RH may be modified by controlling the pretreatment and reaction conditions.

The RHs used in this research were obtained from Guangdong Academy of Agricultural Science. Analytical reagent grade hydrochloride acid (37 wt %) and $KNO_3$ were ordered from Alfa Aesar, both of which were used as received. The raw RHs were boiled in 10 wt % HCl solution for 2 hours, rinsed with deionized water, and then dried at 100° C. for 24 hours. The dried RHs were then pyrolyzed in a muffle furnace, which was pre-heated to 700° C., for 2 hours to prepare silica nanoaggregates. A control sample was prepared via the same pyrolysis condition but using water rinsed RHs instead of HCl treatment.

Scanning electron microscopy (SEM) images were acquired on a JEOL JSM 6330F field emission-SEM (FE-SEM). The samples were sputter coated with a thin layer (ca. 3 nm) of Au/Pd prior to SEM imaging. Transmission electron microscopy (TEM) imaging was carried out using a FEI Tecnai G2 F20 with field emission gun (FEG), at a working voltage of 200 kV. Observations were made through the holes of the carbon support film, so that no noise from the support film was introduced.

Small angle X-ray scattering (SAXS) experiments were performed on a Rigaku D/MAX-1200/2203F5 small angle apparatus with a scattering angle $2\theta$ of 0.1-3.0°. Scattered X-ray intensity $I(q)$ was recorded as a function of the scattering wave vector q ($q=4\pi \sin \theta/\lambda$, $\lambda=0.1540$ nm, the wavelength of the incident X-ray). The surface area and porosity of the selected silica samples were characterized using a Micromeritics' Accelerated Surface Area and Porosimetry (ASAP) 2020 analyzer (Atlanta, Ga., USA) by N2 sorption at 77 K. The samples were dried at 100° C. for 12 hours prior to the test. X-ray diffraction (XRD) patterns were recorded using a Bruker D8 diffractometer with Bragg-Brentano $\theta$-$2\theta$ geometry (20.0 kV and 5.0 mA), using a graphite monochromator with Cu K$\alpha$ radiation.

Figure 1A:
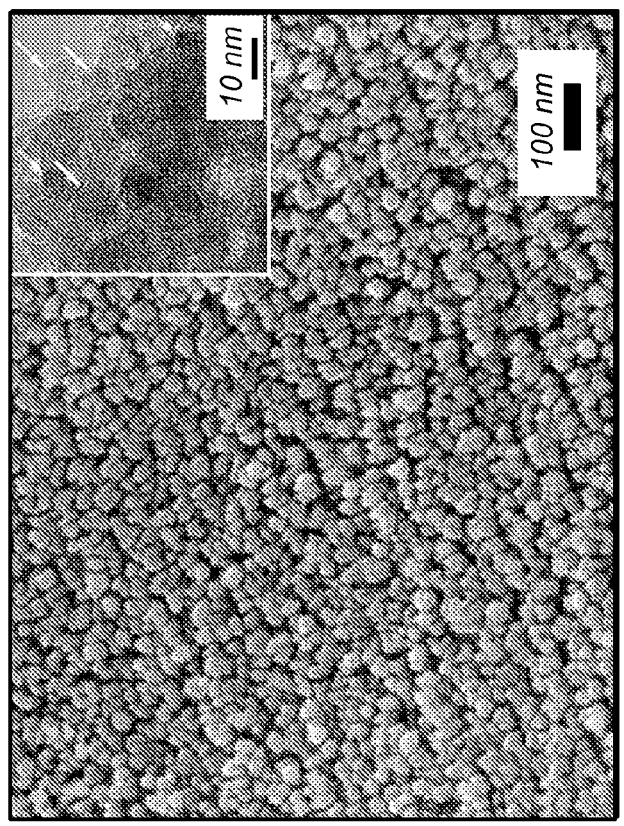
FIG. 1A depicts an SEM image of silica nanoaggregates synthesized from HCl treated RHs.
Figure 5:
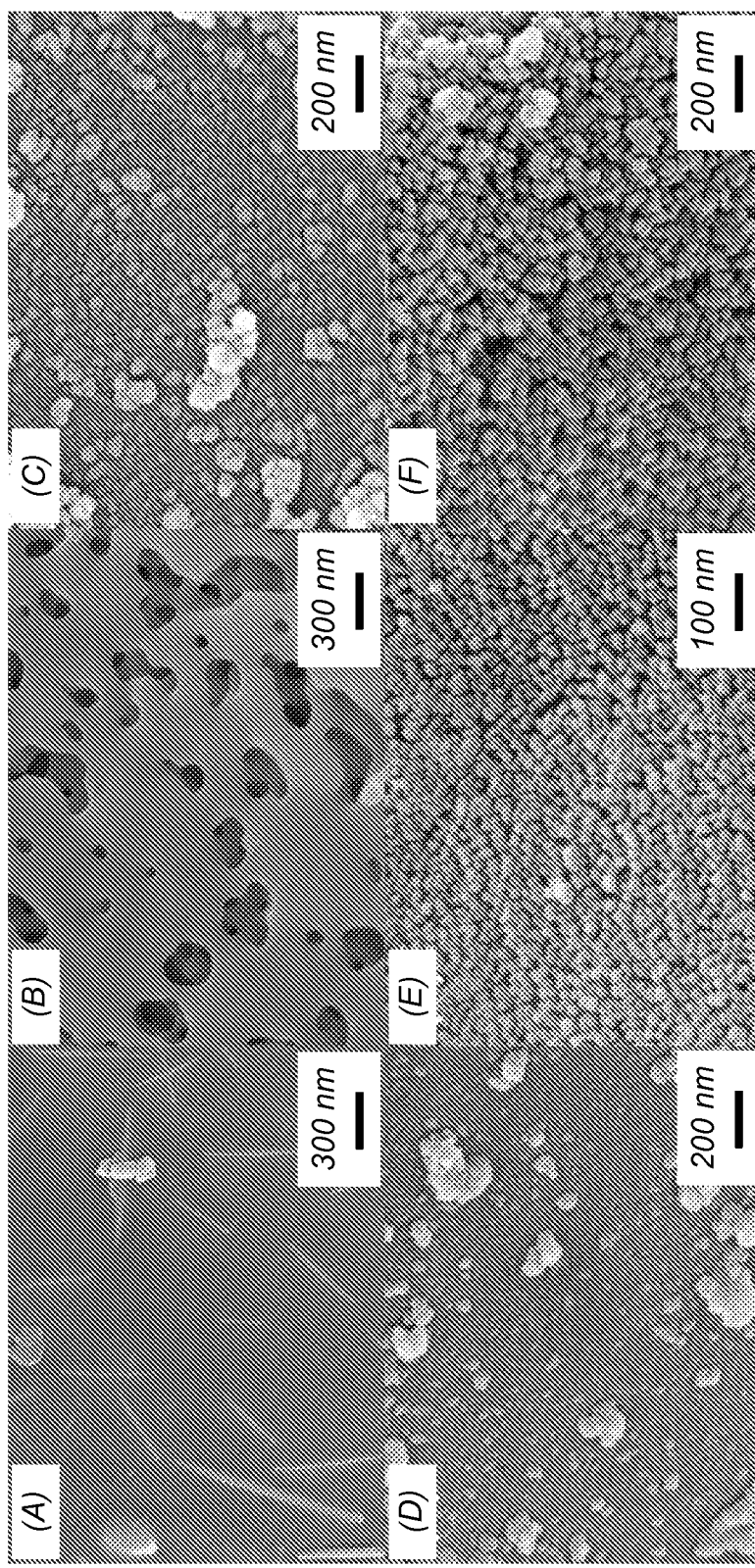
FIG. 5 depicts SEM images of silica samples.

In addition to hydrated silica, RHs are mainly composed of cellulose, hemicellulose, lignin, and low concentrations of various metal cations. RHs were firstly boiled in 10 wt % HCl solution for 2 hours to remove most of the metal cations. Silica nanoparticles were successfully obtained by pyrolyzing the HCl treated RHs at 700° C. for 2 hours. As shown in FIG. 1A, the synthesized silica nanoparticles possess narrow size distribution of ca. 25-30 nm. The XRD pattern (as shown in FIG. 5, which will be further discussed below) clearly shows that such silica nanoparticles are amorphous. The inset of FIG. 1A shows the observation of smaller primary particles under TEM, as illustrated by the arrows. In contrast, the sample synthesized via the same reaction condition but using water rinsed RHs exhibited significant aggregation (as shown in FIG. 1B), due to the melting of silica.

While HCl pretreatment shown to be effective to remove metal cations to minimize the aggregation of silica nanoparticles, potentially allowing the resultant silica to maintain its original structure in cell wall, the SEM characterization could only disclose the formation of silica nanoaggregates. It is hard to further magnify to observe more detailed microstructure within individual nanoaggregates owing to the resolution limit of SEM. Considering silica typically precipitates on cell walls, in cell lumen, and as extracellular deposits, their biogenic nature indicates that even finer microstructures might exist. To explore potential microstructures within individual nanoparticles, TEM was adopted for further characterization. The TEM inset presented in FIG. 1A roughly shows that the 25-30 nm silica nanoaggreagtes are composed of clustering of primary nanoparticles with a diameter less than 10 nm. But because the primary nanoparticles severely overlap and adhere to each other, it is hard to observe individual primary nanoparticles under TEM.

Figure 2:
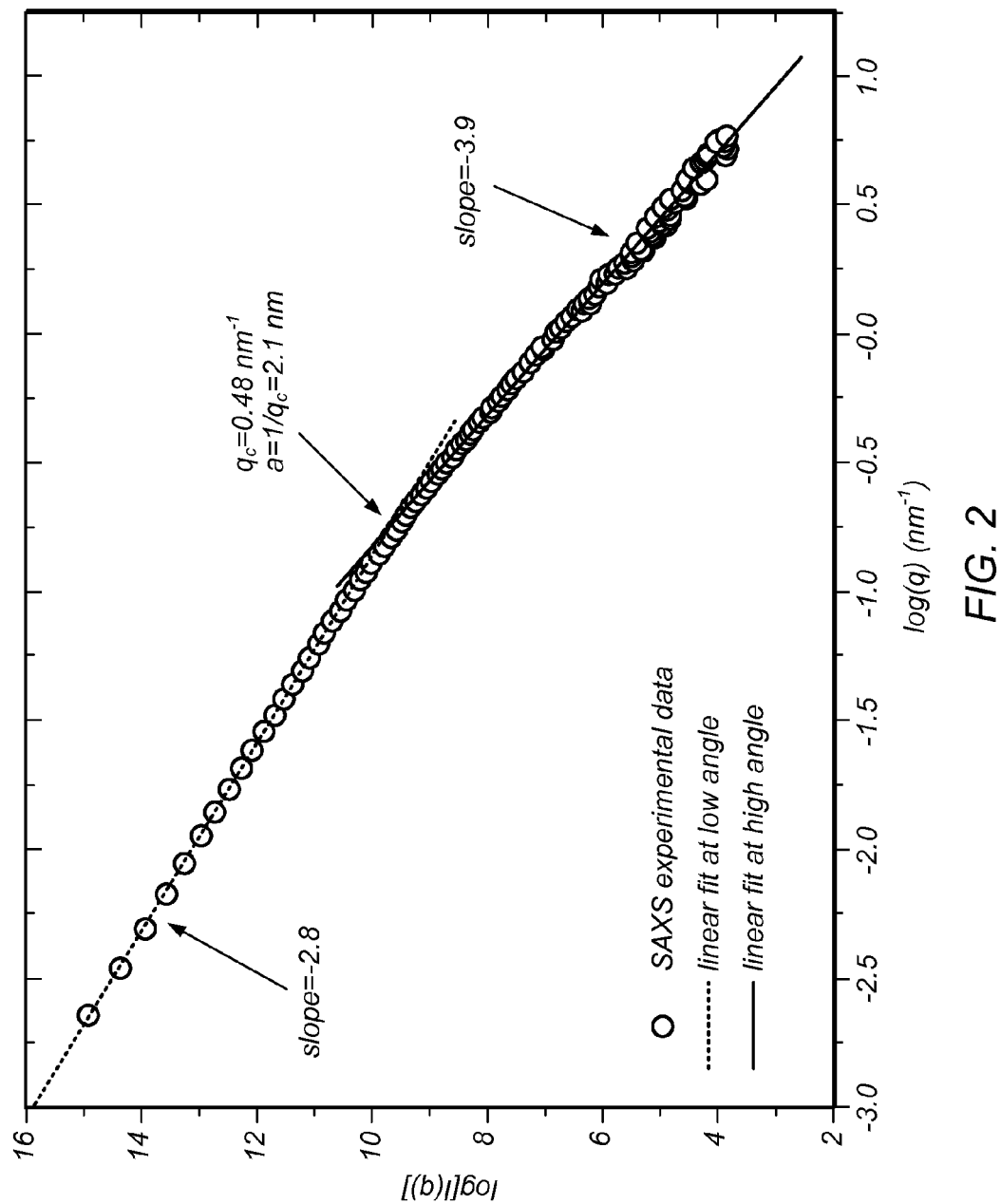
FIG. 2 depicts an SAXS pattern of silica nanoparticles from RH biomass.

To further investigate the potential microstructures within the silica nanoaggregates from RHs, SAXS was selected. SAXS is a primary tool to investigate the structure of mass fractal aggregates since it can probe structure over several orders in length scale, which includes both the primary particles and fractal aggregates. Mass fractal aggregates show three defining features in I(q) versus q scattering data plotted on natural log—natural log scale: a power law $(I(q) \sim q^{D_s-6})$ region corresponding to the surface scattering from the primary particles; a second power law region $(I(q) \sim q^{-D_m})$ at lower q values corresponding to the scattering from the aggregates; and a curved crossover region between the two power laws. This crossover region occurs at q-value ($q_c$) of the order of 1/a, where a is the radius of the primary particles. The exponent $D_m$ can be interpreted as a fractal dimension, which is a measure of the branching of the particle aggregates. The exponent ($D_s-6$) gives information about the surface structure of the primary particles. Smooth particles have a surface-fractal dimension $D_s=2$, which cause a Porod-decay $(I(_q) \sim q^{-4})$; while rough particles give slopes between −3 and −4. Unlike TEM, which focuses on selected particles, SAXS offers an advantage to give statistical information from a large amount of sample. As shown in FIG. 2, two regimes of power-low scattering can be observed in the measured SAXS pattern presented in the log-log plot. The results indicate that the primary particle diameter of the silica nanoparticles is about 4.2 nm (2a≈4.2 nm). Its surface fractal dimension $D_s$ is about 2.1, indicating the presence of a relatively smooth surface for the primary particles. The mass fractal dimension $D_m$ is about 2.8, showing the self-similar property of these silica nanoparticles. The $D_m$ value of 2.8 is reasonable for a 3-dimensional fractal aggregate.

Figure 3:
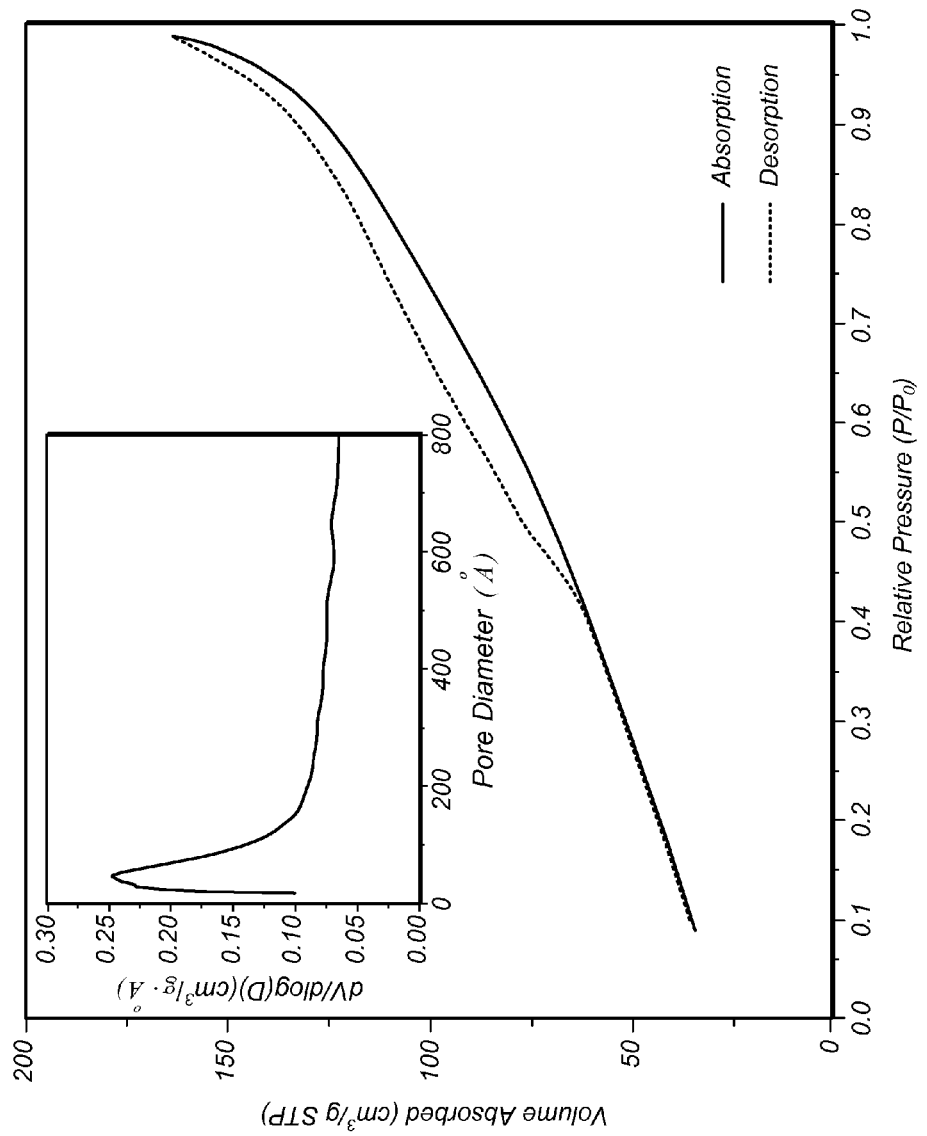
FIG. 3 depicts $N_2$ sorption isotherms of porous silica nanoparticles, the inset shows the pore size distribution obtained from BJH adsorption.

The surface area characterization (FIG. 3) further revealed that such silica nanoaggregates have a Brunauer-Emmett-Teller (BET) surface area of 164 m²/g. If the silica nanoparticles (with a diameter of ca. 25-30 nm) were solid (non-porous), they should have a specific surface area of ca. 90-108 m²/g (assuming the particles are spherical and without any surface contact among particles, and the density of amorphous silica is 2.22 g/cm³). Thus, the result of the BET surface area test proved that those 25-30 nm silica nanoparticles were indeed porous, which was also consistent with the above TEM and SAXS characterizations. The Barret-Joyner-Halenda (BJH) analysis, as shown in the inset of FIG. 3, revealed that such silica nanoparticles possess a group of pores with a diameter mainly ranging from ca. 2.0-9.0 nm, which is believed to be contributed by the gaps between the primary particles. In brief, the surface area and porosity characterization supplements the TEM and SAXS results, suggesting that the 25-30 nm silica nanoparticles are composed of smaller primary particles with a diameter of ca. 4.2 nm. Those primary silica nanoparticles cluster to form a porous structure.

A series of pretreatments and pyrolysis conditions were adopted to synthesize silica samples with various morphologies for evaluation, as summarized in Table 1. A pyrolysis temperature of 600° C. led to grey colored RHS2-600 and RHS3-600 samples. Evaluation of such grey colored silica samples suggested that the carbonous impurities did not negatively prevent the conversion of silica to form organosilicon compounds. However, they severely complicated the purification process. In some embodiments, it may be necessary to remove those carbonous impurities so that the RH silica can be used for potential commercial applications.

TABLE 1

Summary of the pretreatments and pyrolysis conditions for the synthesis of silica samples.

| Pretreatment | Pyrolysis temperature (° C.) | Pyrolysis time (h) | Sample ID | Sample color |
| --- | --- | --- | --- | --- |
| None | Natural burning in an open field | | RHS1 | Grey |
| Rinsed with deionized water three times at room temperature and then dried at 100.0° C. for 24 hours | 600 | 2 | RHS2-600 | Grey |
| | 700 | 2 | RHS2-700 | Light grey |
| | 800 | 2 | RHS2-800 | Light grey |
| Boiled in 10 wt % HCl for 2 hours to remove metal impurities, then rinsed with deionized water, and finally dried at 100.0° C. for 24 hours | 600 | 2 | RHS3-600 | Grey |
| | 700 | 2 | RHS3-700 | White |
| | 800 | 2 | RHS3-800 | White |

Figure 4:
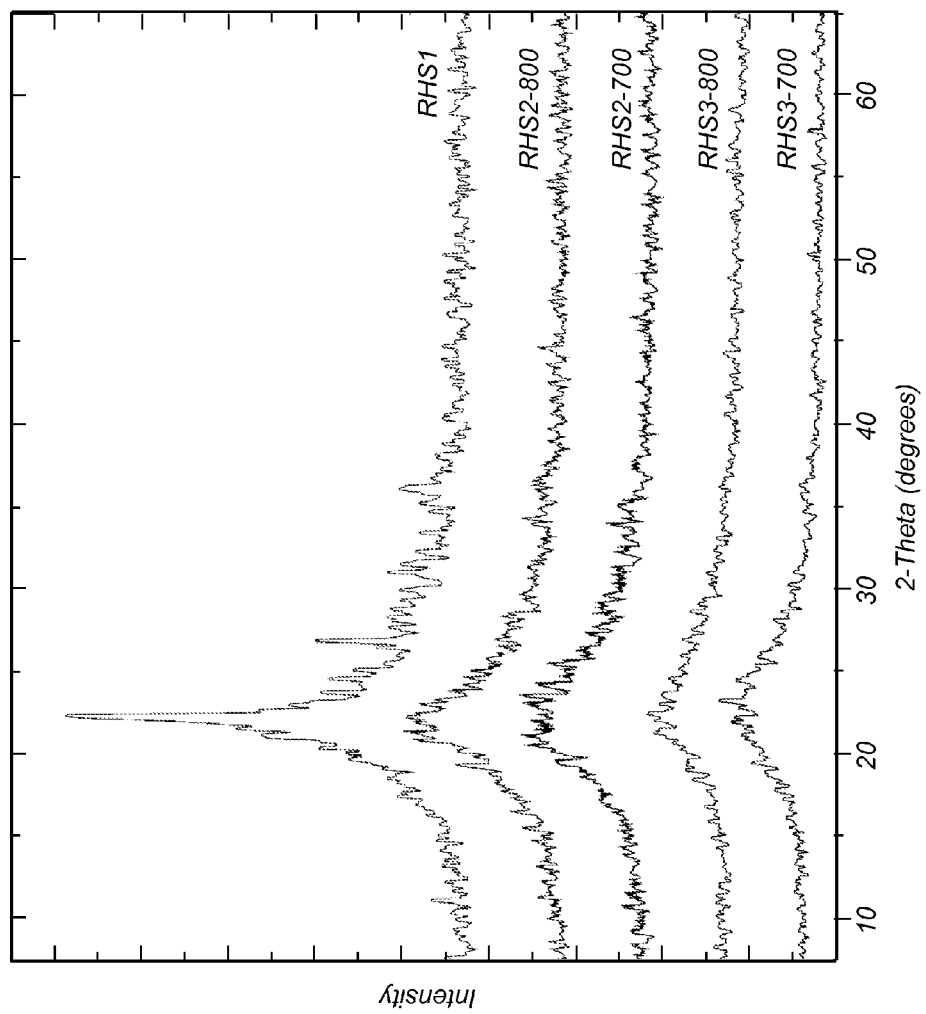
FIG. 4 depicts XRD patterns of silica obtained from various pretreated RHs under different pyrolysis conditions.

The hydrated silica in RHs is originally in amorphous phase. After pyrolysis reaction, silica exists in various levels of crystallinity and purity (as roughly indicated by color as summarized in Table 1) depending on the pretreatment and pyrolysis conditions. Natural burning of raw RHs in an open field generated RH ash, which was a mixture of off-white, grey, and black powders. Black color was contributed by the carbonous residues from the incomplete degradation of organic components in RHs. Off-white RH ash with a trace amount of grey/black particles were carefully collected, and hereafter referred to as RHS1. Overall, RHS1 exhibits a grey color after grounding. The X-ray diffraction (XRD) characterization showed that RHS1 is a mixture of amorphous and crystalline silica, as evidenced by the sharp diffraction peak imposed on a broad hump as shown in FIG. 4.

Rinsing RHs with water helps significantly lower the overall crystallinity of the prepared silica (RHS2 series), while the treatment with HCl turned to be even more effective (RHS3 series). This is because HCl treatment can effectively remove $K^+$ cations, which can catalyze the melting of silica, while rinsing with water can only partially remove $K^+$ cations, as determined by the elemental analysis of the selected silica samples (RHS1, RHS2-700, and RHS3-700). Because of the effective removal of $K^+$ cations, the HCl treated RHs appeared to be much less sensitive to the pyrolysis temperature compared to the water rinsed ones in terms of maintaining amorphous phase. For example, two hours pyrolysis of HCl treated RHs at a temperature up to 800° C. still resulted in amorphous silica. However, the silica obtained from the water rinsed RHs started to exhibit appreciable level of crystallinity when the pyrolysis temperature was raised to 800° C., as shown in FIG. 5.

The color of the prepared silica samples is also consistent with their crystallinity and pyrolysis temperature. RHS3-700 and RHS3-800 sample exhibit white color, indicating they are free of carbonous residues. While RHS2-700 and RHS2-800 appear to contain a trace amount of carbonous residues, exhibiting light grey color. That is because water rinse can only partially remove $K^+$ cations. During the melting of silica particles catalyzed by $K^+$ cations, a tiny amount of carbonous residues were encapsulated within the silica crystal structure, which cannot be removed even after two hours of pyrolysis at 800° C.

The scanning electron microscopy (SEM) images of the silica samples are shown in FIG. 5. Two typical morphologies of RHS1 were observed: virtually completely melted silica (FIG. 5A) and partially melted silica forming irregular porous structure (FIG. 5B). The results indicated that with increasing temperature, silica particles started to melt and gradually fused together. Since the RHs went through uncontrolled combustion, certain regions reached silica melt temperature and maintained at melting state long enough, which allowed the melt to merge. Upon cooling, they form crystalline silica. While for certain regions, owing to insufficient heat supply, they cooled down before silica completely melted and fused. This led to irregular porous structure.

FIGS. 2C and 2D present the morphology of RHS2-700 and RHS2-800, respectively. As the images clearly show, after 2 hours of pyrolysis at 700° C., the water rinsed RHs were converted to fine silica particles with a diameter ranging from ca. 30 to 80 nm. However, pyrolysis at a higher temperature of 800° C. for 2 hours led to the melting of silica nanoparticles, resulting in semi-crystalline aggregates. Ultrafine silica nanoparticles were successfully obtained by pyrolyzing HCl treated RHs at 700° C. for 2 hours. Silica nanoparticles with narrow size distribution of ca. 20-30 nm were shown in FIG. 2E. Upon increasing pyrolysis temperature to 800° C., silica nanoparticle clusters formed, indicating the start of melting of some of the silica particles (FIG. 2F). The much less significant melting of silica nanoparticles shown in FIG. 2F compared to the ones shown in FIG. 2D is owing to the much more effective removal of $K^+$ cations by HCl treatment than by water rinse. Overall, the morphology of the silica samples shown in SEM images is consistent with their crystallinity characterized by XRD as shown in FIG. 4.

Sample RH3-700 was also imaged under transmission electron microscopy. The particle size from TEM agrees well with the SEM characterization. The surface area of each silica sample was measured and is listed in Table 2. Their surface area agrees well with the sample crystallinity and morphology. The effect of silica surface area on its reactivity will be discussed later.

The porous structure of RH silica, as confirmed by the BET/BJH characterization discussed above, is possibly originated from the limited marginal melting of primary silica nanoparticles during the synthesis. As aforementioned, RHs contain potassium cations, which can catalyze the melting of silica during pyrolysis, generating severe aggregation as shown in FIG. 1B. While HCl treatment can effectively remove majority of potassium cations, a trace amount of potassium cations might remain even after HCl leaching, which could be the cause for the clustering of primary nanoparticles to form porous silica nanoparticles.

A secondary porous structure may be generated by further partially melting the silica nanoparticles. Ideally, one might be able to fabricate an ordered porous structure by tailoring the pretreatment of the synthesized nanoparticles and subsequent pyrolysis conditions.

In an embodiment, silica nanoaggregeates synthesized from the pyrolysis were then ultra-sonicated in 0.20 and 0.50 M $KNO_3$ solution, respectively, followed by 1 hour of stirring. The samples were then filtered and dried at 105° C. for 4 hours. The dried samples were subsequently pyrolyzed at 800° C. for 2, 4, and 8 hours to form semi-crystalline porous silica framework.

Figure 6:
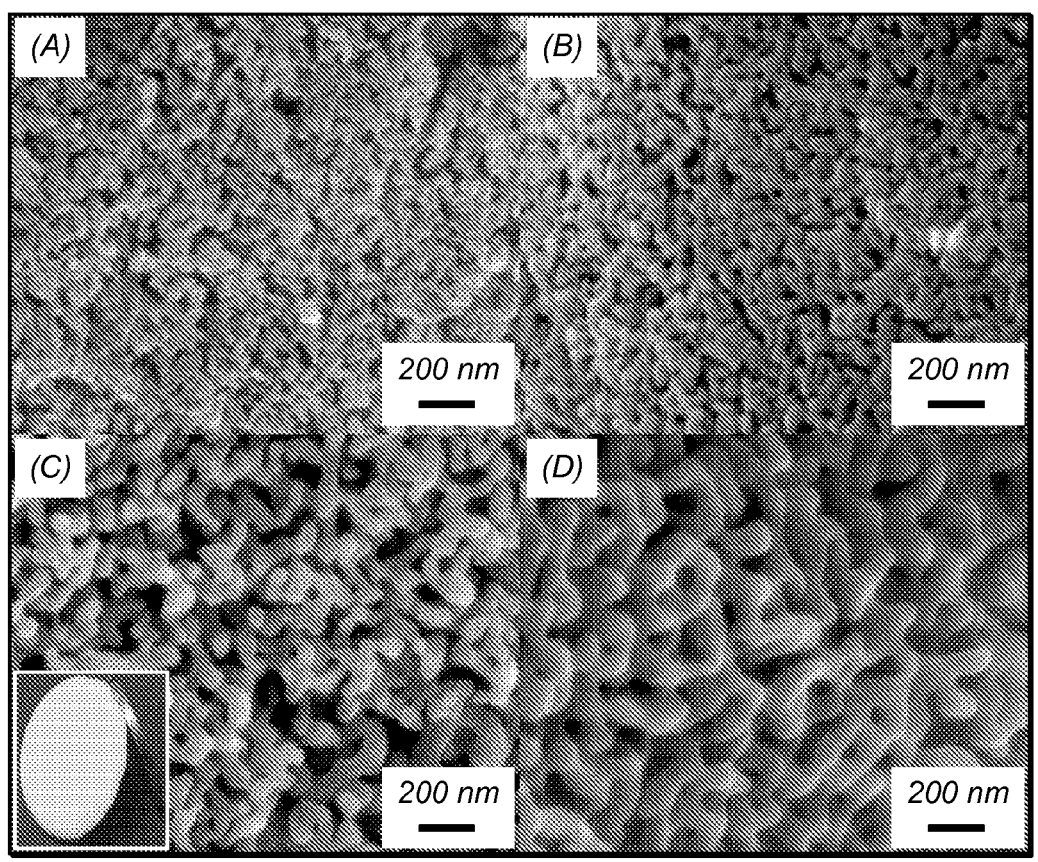
FIG. 6 depicts SEM images of meso/macro porous silica frameworks.
Figure 7:
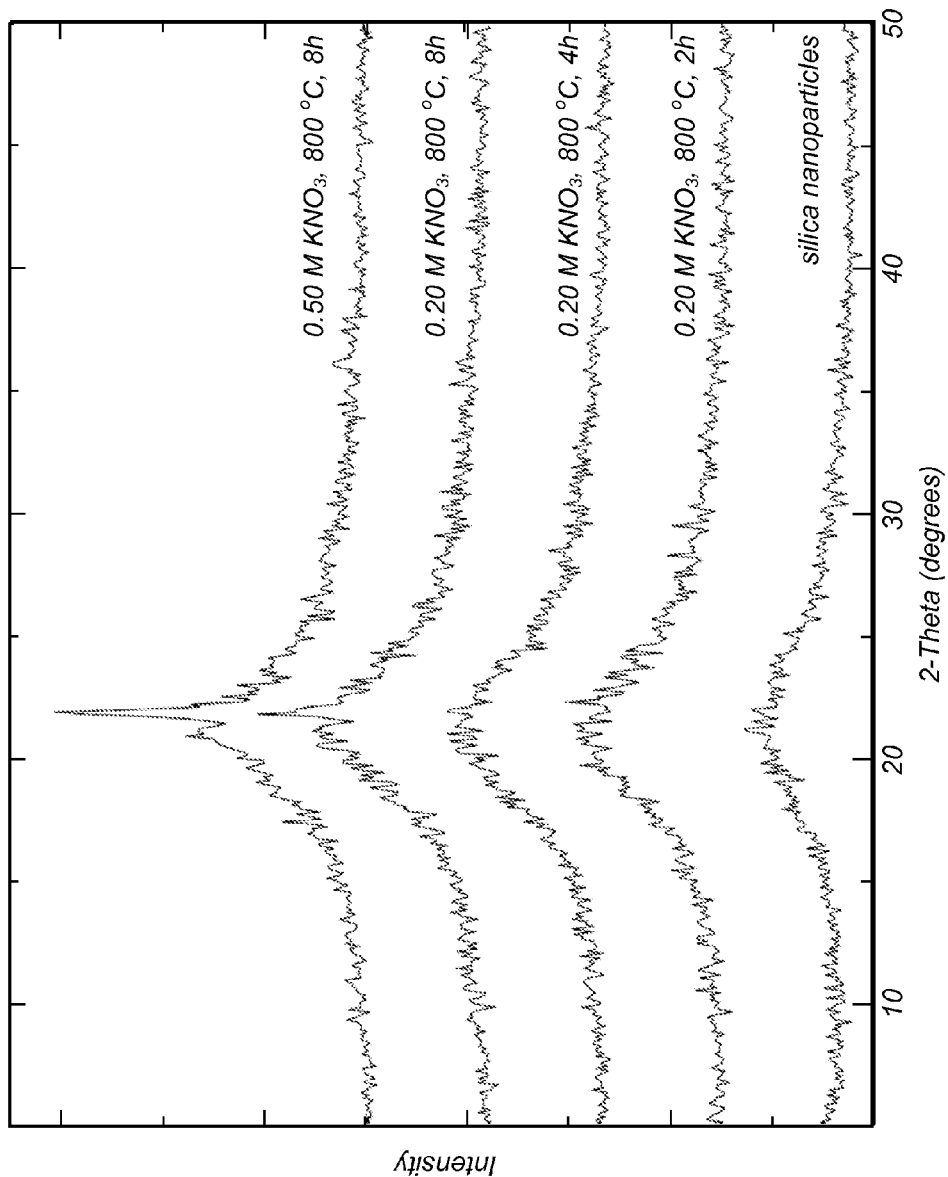
FIG. 7 depicts XRD patterns of $KNO_3$ solution treated silica nanoaggregates.

The purpose for $KNO_3$ treatment is to introduce $K^+$ cations into the porous structure of silica nanoparticles, which should promote the melting of silica nanoparticles to form porous structure. It was observed that upon contact with a drop of $KNO_3$ solution, the porous silica nanoparticles can quickly absorb the solution drop. It is expected that the different concentrations of $KNO_3$ will lead to different levels of doping of $K^+$ cations in silica nanoparticles, which will result in different degrees of melting and thus different pore structures and pore sizes. FIG. 6 shows the SEM images of a series of porous silica framework synthesized from the above $KNO_3$ treated samples pyrolyzed at 800° C. for various durations. FIGS. 6A, 6B, and 6C clearly show the gradual melting and pore structure formation progress of 0.20 M $KNO_3$ solution treated silica nanoparticles. After 2 hours of pyrolysis at 800° C., the silica nanoparticles started to stick together. After 4 hours of treatment, the nanoparticles began to fuse and form porous structure, with a pore size of ca. 20 nm. After 8 hours of synthesis, well defined pore structure formed, with pore size ranging from ca. 25-40 nm. Treatment with a higher concentration of $KNO_3$ solution (0.50 M) apparently led to more pronounced fusing of silica nanoparticles. While the pore size did not change much compared to the 0.20 M $KNO_3$ treated sample, it led to the formation of much thicker wall (FIG. 6D). These results confirm the above hypothesis that one may tailor the pretreatment and pyrolysis condition to synthesize meso/macro porous silica from RHs with tunable structures. It should be noted that such secondary porous silica is semi-crystalline. As shown in FIG. 7, the 25-30 nm silica nanoparticles from RHs are initially amorphous. Extended pyrolysis of 0.20 M $KNO_3$ solution treated silica nanoparticle at 800° C. gradually enhanced the sample crystallinity. While the 0.50 M $KNO_3$ solution treated silica nanoparticle exhibited even higher degree of crystallinity under the same pyrolysis treatment. More importantly, with increasing crystallinity, the silica nanoparticles can be processed to form any desirable shape, and possess sufficient structural integrity (a coin shaped disc as an example is presented in the inset of FIG. 6C). Thus, they might find wider applications and exhibit superior performance compared to amorphous porous silica, such as filtering, etc.

Figure 8:
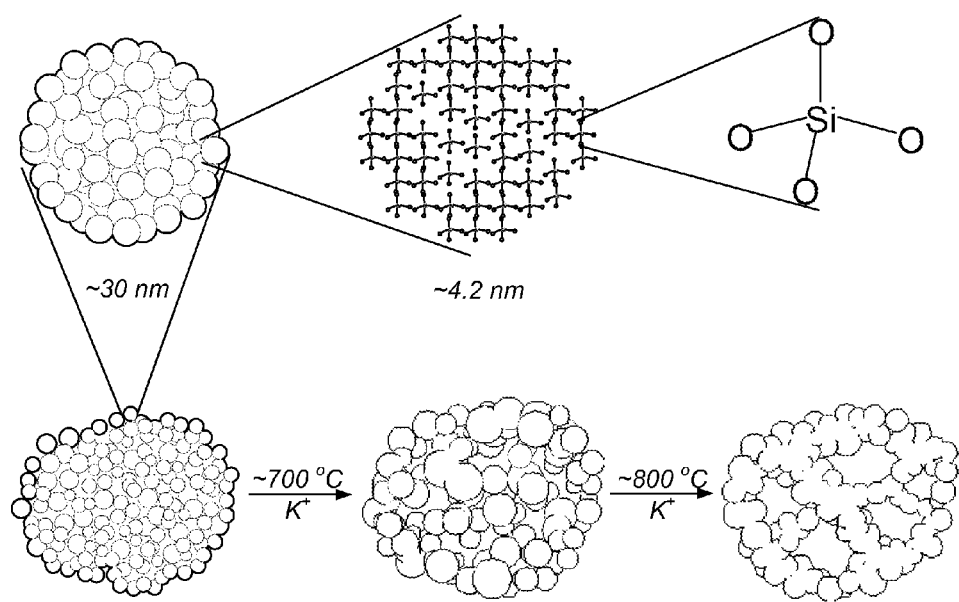
FIG. 8 depicts a hierarchical structure model of silica nanoaggregates synthesized from RHs and the formation mechanism of porous silica framework.

The hierarchical structure of the porous silica nanoaggregates and the porous silica structures synthesized from RHs is summarized in FIG. 8. The diameter of the primary silica nanoparticles is ca. 4.2 nm according to the SAXS characterization. At the next level, primary particles cluster to form larger silica aggregates with a diameter of ca. 25-30 nm, as imaged under SEM (FIG. 1A). The mass fractal dimension is about 2.8 showing 3-dimensional self-similar property over the range of ca. 4.2 to 25-30 nm. At the next level, the silica nanoaggregates bundle to form large clusters. Under elevated temperatures, particularly in the presence of potassium cations, the silica nanoaggregates gradually melt and fuse together to form larger aggregates and subsequently to form porous structures (and eventually to form silica bulk with sufficiently long heating). Their amorphous morphology converts to semi-crystalline gradually during the process.

Organosilicon compounds are a group of important materials and used in a wide variety of areas such as biocides, polymers, advanced ceramics, electronic components, etc. However, their synthesis relies virtually exclusively on the carbothermal reduction of silica to silicon and subsequent reaction between silicon and aryl chloride. This multi-step approach involves high temperature, high pressure, and strong acidity, which is energy-intensive, expensive, and eco-hazardous. Thus, it is highly desirable to seek new approaches that are more economical and environmentally benign, which may in turn help widen the applications of organosilicon compounds.

To address the above challenge, several groups have explored alternative approaches, which bypass the carbothermal process, to synthesize organosilicon compounds from silica. Such approaches typically require much lower reaction temperatures and energy consumption than the carbothermal process. In particular, one-step reactions are known which can directly convert silica to various silicon complexes via a reaction with alkali (or alkali earth) hydroxide and ethylene glycol (EG). The ultimate goal for these researches is to produce organosilicon compounds directly from low cost silica resources, such as sand, which is widely available on earth. However, when sand is used as the starting material, it requires much longer reaction time (>200 hours) due to its low reactivity, which sets a huge obstacle for commercial production. While fumed silica exhibits high reactivity and yield, the high cost of fumed silica diminishes the advantage of this novel approach. Therefore, it is highly desirable to seek an alternative silica resource which is of low cost and possesses sufficiently high chemical reactivity, so that it can be converted to organosilicon compounds via one of the developed low temperature approaches at high reaction rate and yield.

In an embodiment, a method of making organosilicon complexes includes combining silica nanoaggregates as described herein with ethylene glycol in the presence of an alkali metal base or an alkali earth metal base. In some embodiments, the alkali metal base is an alkali metal hydroxide base (e.g., potassium hydroxide).

The reaction of silica with EG and KOH to produce a pentacoordinate silicon complex, $KSi(OCH_2CH_2O)_2 OCH_2CH_2OH$ (Equation 1), was selected to evaluate the reactivity of the synthesized silica samples from RHs. Such silicon complexes can be subsequently converted to a variety of organosilicon compounds. In each reaction, 7.50 g of RH silica sample was reacted with 7.00 g of KOH and 135 mL of EG in a round bottom flask connected with a distillation setup at 200° C. with constant stirring. The commercial micro-sized silica (20-40 μm in diameter) and fumed silica were evaluated as controls.

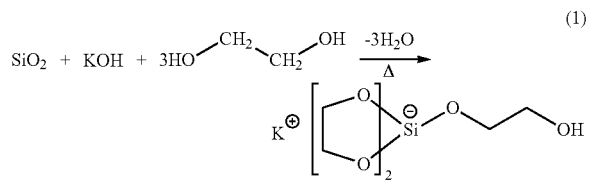

(1)

After reacting for a pre-determined amount of time (1, 2, or 8 hours), the system was evacuated to remove most excessive ethylene glycol, and then cooled down under the protection of nitrogen. The product, pentacoordinate silicon complex $KSi(OCH_2CH_2O)_2OCH_2CH_2OH$, and the unreacted silica, were collected. Selected $KSi(OCH_2CH_2O)_2OCH_2CH_2OH$ samples were further purified by recrystallization in methanol/acetonitrile, and finally dried in a vacuum oven at 130° C. for 2 hours for various characterizations.

Figure 9:
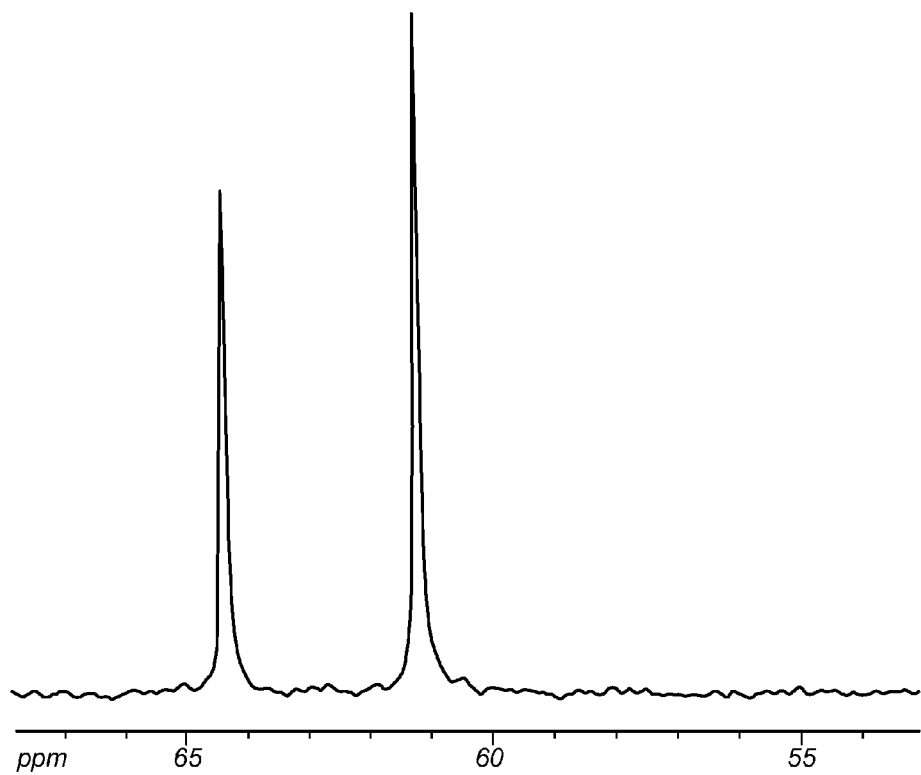
FIG. 9 shows the $^{13}C$ NMR spectrum of $KSi(OCH_2CH_2O)_2 OCH_2CH_2OH$ dissolved in $CD_3OD$.

The detailed characterization results, including $^1H$, $^{13}C$, $^{29}Si$ NMR spectra, solid-state $^{29}Si$ cross-polarization magic angle spinning (CP/MAS) NMR spectrum, and energy-dispersive spectrum, all agree well with the literature data and support the formation of $KSi(OCH_2CH_2O)_2OCH_2CH_2OH$. FIG. 9 shows the $^{13}C$ NMR spectrum of $KSi(OCH_2CH_2O)_2 OCH_2CH_2OH$ dissolved in $CD_3OD$. It has been revealed that $KSi(OCH_2CH_2O)_2OCH_2CH_2OH$ dissolves in $CD_3OD$ via a ligand exchange process as shown in Equation 2, instead of a simple dissolution process. This also explains why methanol is the only polar solvent to effectively dissolve $KSi(OCH_2CH_2O)_2OCH_2CH_2OH$. The $^{13}C$ NMR spectrum presented in FIG. 9 shows two peaks. The peak at ca. 64.4 ppm matches the free EG in solvent, 12, 25 while the one located at ca. 61.3 ppm is from the bonded EG as shown in Equation 2.

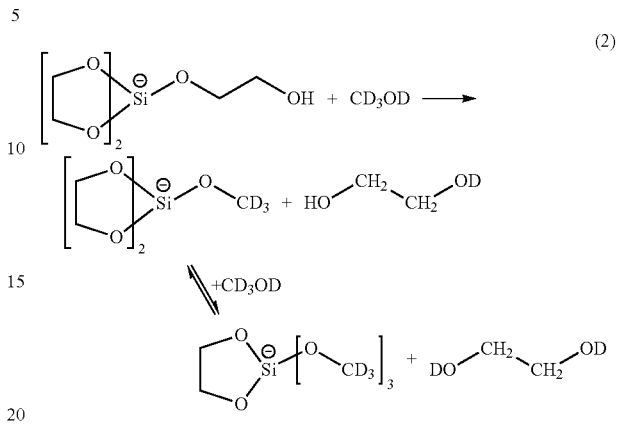

(2)

Figure 10:
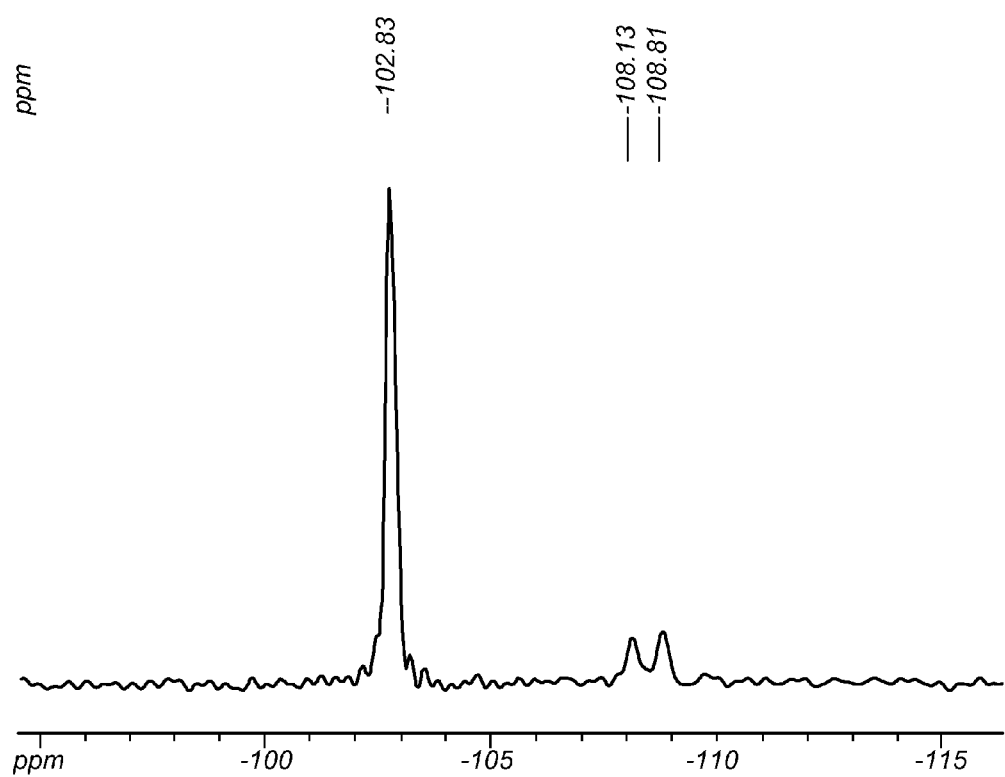
FIG. 10 shows the solid-state $^{29}Si$ CP/MAS NMR spectrum of dried $KSi(OCH_2CH_2O)_2OCH_2CH_2OH$.

The $^{29}Si$ $CD_3OD$ solution NMR spectrum of $KSi(OCH_2CH_2O)_2OCH_2CH_2OH$ shows a peak at −103.0±0.3 ppm. The Solid-state $^{29}Si$ CP/MAS NMR spectrum of dried $KSi(OCH_2CH_2O)_2OCH_2CH_2OH$ (FIG. 10) exhibits the same −103 ppm peak. This shows that the silicon magnetic environment in the solid state is almost identical to its solution environment, indicating that the counter cations do not affect the magnetic environment of Si. The two weak peaks at 108.1 and 108.8 ppm in FIG. 10 are contributed by the polymeric glycolates, $[KSKOCH_2CH_2O)_{2.5}]_n$.

In addition, the solution $^1H$ NMR and elemental analysis results also show high consistency with the above NMR characterizations, and support the formation of $KSi(OCH_2CH_2O)_2 OCH_2CH_2OH$.

The conversion data in Table 2 show that the silica from RHs exhibited much higher reactivity compared to the micro-sized crystalline silica particles. Overall, the conversion rates show a high consistency with the surface area of the silica samples. Generally, the synthesis proceeded in less than 2 hours with a conversion rate of greater than 90%. Both RHS2 and RHS3 silica samples exhibited reduced reactivity with increasing pyrolysis temperature from 700 to 800° C. The reactivity trends of RHS2 and RHS3 silica samples show a good correlation with their crystallinity and morphology as shown in FIGS. 4 and 5. After one hour of reaction, approximately 94% RHS3-700 silica was reacted; extending reaction time to two hours further led to a higher conversion rate of 98%. The yield based on the recrystallized $KSi(OCH_2CH_2O)_2 OCH_2CH_2OH$ is about 90% of theory for 2 hours of reaction using RHS3 as the starting material. The reactivity of RHS3-700 is slightly lower than that of fumed silica, but the cost of RHS3-700 is estimated to be much lower. Even for RHS1 silica, a conversation rate of 56% was achieved, which is believed to be mainly contributed by its amorphous component. In contrast, the conversation rates for the reactions using micro-sized crystalline silica particles (mimicking natural sand) are only 2 and 6% for a reaction time of 1 and 8 hours, respectively.

While this data focuses on the pentacoordinate silicon complex, the silica nanoparticles from RHs can also be converted to several hexacoordinated silicon complexes reported in the literature via low temperature processes. Such organosilicon complexes can be subsequently converted to a variety of organosilicon compounds, which can be directly used for industrial applications, or be polymerized to form silicon containing polymers.

TABLE 2

Evaluation of silica samples via the reaction with ethylene glycol and KOH.

| Samples | Surface Area (m²/g) | REACTION TIME (H) | Rate of conversion (%) |
|---|---|---|---|
| Fumed silica | 380.0 | 1.0 | 99 |
| RHS3-700 | 164.0 | 1.0 | 94 |
|  |  | 2.0 | 98 |
| RHS3-800 | 143.7 | 1.0 | 90 |
| RHS2-700 | 24.2 | 1.0 | 85 |
| RHS2-800 | 22.5 | 1.0 | 78 |
| RHS1 | 2.1 | 1.0 | 56 |
|  |  | 8.0 | 78 |
| Crystalline silica particles | 0.3 | 1.0 | 2 |
|  |  | 8.0 | 6 |

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of preparing a porous silica framework comprising:
    boiling biomass material in an aqueous acidic medium for at least 0.5 hours; and
    heating the acid treated biomass material to a temperature of at least about 500° C. for at least about 0.5 hours to form silica nanoaggregates;
    treating the silica nanoaggregate with a potassium ion containing aqueous solution;
    heating the potassium ion treated silica nanoaggregates to a temperature of at least about 800° C. to form the porous silica framework.

2. The method of claim 1, wherein the biomass material is rice husks.

3. The method of claim 1, where the acidic medium is hydrochloric acid.

4. The method of claim 1, wherein the acid treated biomass material is treated at a temperature of between about 500° C. and about 850° C.

5. The method of claim 1, wherein the acid treated biomass material is treated at a temperature of at least about 500° C. for a time of between about 0.5 hour to about 2 hours.

6. The method of claim 1, further comprising:
    washing the acid treated biomass material with water; and
    drying the washed acid treated biomass material prior to heating.

7. The method of claim 1, wherein the acidic medium is an aqueous hydrochloric acid solution.

* * * * *